US011120223B2

(12) United States Patent
Katz et al.

(10) Patent No.: US 11,120,223 B2
(45) Date of Patent: Sep. 14, 2021

(54) PROBABILISTIC WORD EMBEDDINGS FOR TEXT CLASSIFICATION

(71) Applicant: SAP SE, Walldorf (DE)

(72) Inventors: Gil Katz, Paris (FR); Mathis Lamarre, Paris (FR)

(73) Assignee: SAP SE, Walldorf (DE)

( * ) Notice: Subject to any disclaimer, the term of this patent is extended or adjusted under 35 U.S.C. 154(b) by 103 days.

(21) Appl. No.: 16/444,794

(22) Filed: Jun. 18, 2019

(65) Prior Publication Data

US 2020/0401658 A1 Dec. 24, 2020

(51) Int. Cl.
G06F 40/295 (2020.01)
H04L 12/58 (2006.01)
G06F 40/216 (2020.01)

(52) U.S. Cl.
CPC .......... G06F 40/295 (2020.01); G06F 40/216 (2020.01); H04L 51/046 (2013.01)

(58) Field of Classification Search
CPC ..... G06F 40/295; G06F 40/216; H04L 51/046
See application file for complete search history.

(56) References Cited

U.S. PATENT DOCUMENTS

| 2003/0105589 | A1* | 6/2003 | Liu | G06F 16/40 |
| | | | | 702/1 |
| 2009/0327260 | A1 | 12/2009 | Li et al. | |
| 2014/0149113 | A1* | 5/2014 | Kadirkamanathan | |
| | | | | G10L 15/285 |
| | | | | 704/235 |
| 2016/0313463 | A1* | 10/2016 | Wahrmund | G01V 1/30 |
| 2018/0181855 | A1 | 6/2018 | Johnson, Jr. et al. | |
| 2019/0320934 | A1* | 10/2019 | Odry | G16H 40/20 |
| 2020/0167429 | A1 | 5/2020 | Katz et al. | |

OTHER PUBLICATIONS

"U.S. Appl. No. 16/199,659, Non Final Office Action dated Aug. 4, 2020", 42 pgs.
"U.S. Appl. No. 16/199,659, Examiner Interview Summary dated Sep. 21, 2020", 3 pgs.

(Continued)

Primary Examiner — Michael Colucci
(74) Attorney, Agent, or Firm — Schwegman Lundberg & Woessner, P.A.

(57) ABSTRACT

Disclosed are systems, methods, and non-transitory computer-readable media for probabilistic word embeddings for text classification. A text classification system receives a message including a keyword and determines an embedding probability distribution representing the keyword. The text classification system then determines an embedding value for the keyword based on the embedding probability distribution. The text classification system uses the embedding value as input into a set of mathematical functions, yielding a first set of coefficient values for the keyword. Each respective mathematical function from the set corresponds to a respective classification label from a set of classification labels and defines a continuous surface. Each respective mathematical function is determined from embedding values for a set of known keywords, distribution variance values for the set of known keywords, and a subset of coefficient values for the set of known keywords that corresponds to the respective classification label.

20 Claims, 6 Drawing Sheets

(56) References Cited

OTHER PUBLICATIONS

"U.S. Appl. No. 16/199,659, Examiner Interview Summary dated Mar. 23, 2021", 3 pgs.
"U.S. Appl. No. 16/199,659, Final Office Action dated Feb. 1, 2021", 58 pgs.
"U.S. Appl. No. 16/199,659, Response filed Mar. 29, 2021, to Final Office Action dated Feb. 1, 2021", 18 pgs.
"U.S. Appl. No. 16/199,659, Response filed Oct. 1, 2020 to Non Final Office Action dated Aug. 4, 2020", 17 pgs.

* cited by examiner

PROBABILISTIC WORD EMBEDDINGS FOR TEXT CLASSIFICATION

TECHNICAL FIELD

An embodiment of the present subject matter relates generally to text classification and, more specifically, to probabilistic word embeddings for text classification.

BACKGROUND

Text classification models are used to classify text. For example, text classification can be used to assign classification labels to documents, such as emails, posts, text messages, product reviews, and the like. One common use for text classification models is to assign classification labels to a text that indicates a meaning or intent of the text. The determined intent of the text can be used to determine an action requested in the text, generate a response to the text, and so forth. Text classification models generally assign coefficient values to words in the text that indicate the probability that the word should be associated with each of the available classification labels. The individual coefficient values are used to determine overall values, which are used to select an appropriate classification label.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
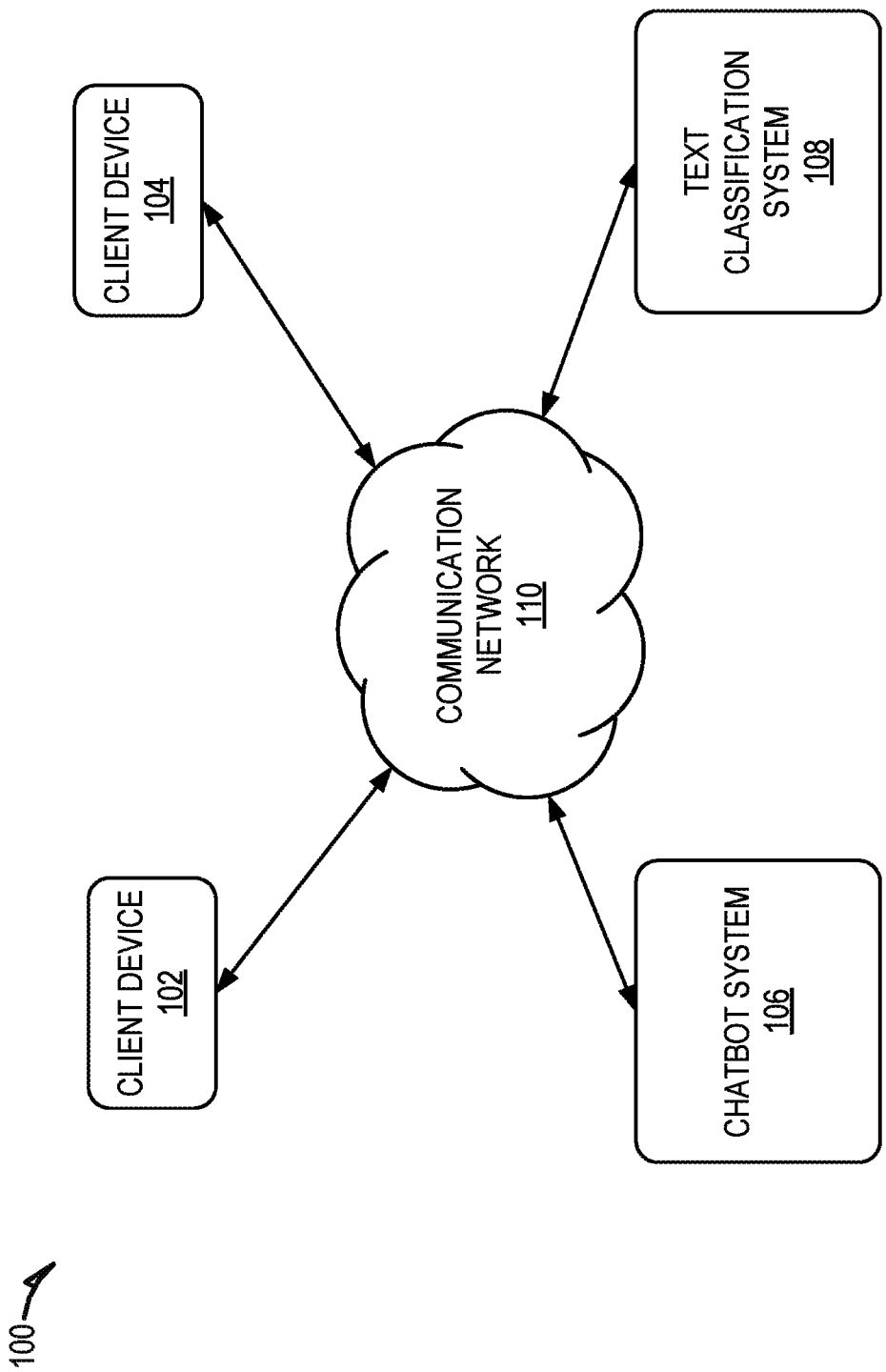
FIG. 1 shows a system, wherein an improved text classification model is used to generate recommended responses to messages received as part of a communication session, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for probabilistic word embeddings for text classification. A text classification system is used to categorize text based on a set of predetermined classification labels that each indicate one possible categorization for the text, such as a possible intent of the text. For example, a text classification system determines a probability value for each of the classification labels based on an analysis of the individual words in the text. The probability values determined for each text classification label indicates the likelihood that the respective classification label properly classifies the text. The text classification label with the highest probability value is determined to have the highest probability of properly categorizing the text (e.g., identifying the intent of the text).

Some text classification systems determine the probability values for each of the classification labels based on coefficient values determined for the individual words or combination of words in the text. Each coefficient value determined for a word or group of words indicates the strength at which the word indicates that the corresponding classification label properly categorizes the word. Accordingly, a word that is a strong indicator of a classification label will have a relatively higher coefficient value for the classification label, whereas a word that is a weak indicator of the classification label will have a relatively lower coefficient value for the classification label. To determine which classification label (e.g., intent) properly categorizes a text, the text classification system determines a set of coefficient values for each word in the text. Each coefficient value in the set of coefficient values corresponds to a unique one of the categorization labels. The text classification system then uses the sets of coefficient values to calculate the probability values for each classification label, which is used to determine the categorization label that most likely categorizes the text. For example, the text is determined to be properly categorized by the categorization label with the highest probability value.

Current text classification systems determine the coefficient values using a predetermined listing of known words and corresponding coefficient values. The term known words refers to words for which an existing coefficient value has been provided to the text classification system during training of the text classification system. The coefficient values are predetermined for the finite set of known words and stored in the listing, which is available to the text classification system. Current text classification systems simply search this listing for each word in a text to determine its corresponding set of coefficient values. One problem with the current approach is that coefficient values are only available for the finite set of known words included in the listing of known words. Words that are unknown (i.e., not included in the listing of known words) are not associated with coefficient values. Current text classification systems generally ignore these unknown words, which diminishes the quality of the resulting probability scores and classification.

In contrast to current systems, the text classification system of the present disclosure uses a set of mathematical functions to determine the set of coefficient values. Each of the mathematical functions outputs a coefficient value for a word, regardless of whether the word is a known word or not. Accordingly, the text classification system of the present disclosure generates a set of coefficient values for each word in a text, rather than only known words as with current systems.

Each mathematical function in the set of mathematical functions outputs a coefficient value for a unique one of the classification labels used by the text classification system. To generate the set of coefficient values for a word, an embedding value representing the word is used as input in each of the mathematical functions in the set of mathematical functions.

The embedding value for a word is a value (e.g., vector) that uniquely represents the word. The text classification system determines the embedding value for a word using an existing probabilistic word representation model, such as Probabilistic FastText, that outputs a Gaussian distribution that represents the word.

A Gaussian distribution is a continuous probability distribution represented by a function indicating the probabilities of occurrence of different possible values representing the word (e.g., bell curve). The text classification system determines the embedding value for the word based on the mean vector of the Gaussian distribution, which indicates the expected value of the word (e.g., the value with the highest probability of occurrence or center, the center of the bell curve). Use of distributions to lean embeddings provides benefits over current systems that use points.

The shape of the Gaussian distribution is defined by a distribution variance value indicating how spread out the values are within the distribution. For example, a word that only has a few likely meanings may be represented by a Gaussian distribution with a relatively smaller distribution variance value, resulting in a visually taller and skinnier distribution. In contrast, a word that has many likely meanings may be represented by a Gaussian distribution with a relatively larger distribution variance value, resulting in a visually shorter and fatter distribution. It should be noted that although the use of Gaussian distributions is described, this is only one example, The embedding values can be based using any type of distribution.

The text classification system determines the set of mathematical functions based on the predetermined sets of coefficient values for the known words, the determined embedding values of each of the known words, and the distribution variance values associated with the Gaussian representations for each of the known words.

As each mathematical function corresponds to only one of the classification labels, the text classification system determines each respective mathematical function based on a subset of the coefficient values for the known words that correspond to the given classification label. Each mathematical function defines a continuous surface over an embedding space that includes each coefficient value in the subset of the coefficient values that corresponds to the given classification label.

The text classification system uses the Gaussian distribution of the known words to determine a mathematical function that defines the continuous surface over the embedding space, such that each point in the embedding space can be attributed a corresponding coefficient value. For example, the text classification system uses the distribution variance values corresponding to each known word to determine the variance of the continuous surface at the point in the embedding space corresponding to the known word. Rather than use the distribution variance values themselves, the text classification system may use the distribution variance values to adjust a standard distribution variance value. For example, the text classification system may compare the distribution variance value corresponding to a known word to a threshold distribution variance value. In the event that the distribution variance value is greater than the threshold distribution variance value, the text classification system may increase the standard distribution variance value used at the point in the continuous surface that corresponds to the known word. Alternatively, in the event that the distribution variance value is less than the threshold distribution variance value, the text classification system may decrease the standard distribution variance value used at the point in the continuous surface that corresponds to the known word.

FIG. 1 shows an example system 100, wherein electronic devices communicate via a network for purposes of exchanging content and other data. As shown, multiple devices (i.e., client device 102, client device 104, chatbot system 106, and text classification system 108) are connected to a communication network 110 and configured to communicate with each other through use of the communication network 110. The communication network 110 is any type of network, including a local area network (LAN), such as an intranet, a wide area network (WAN), such as the Internet, or any combination thereof. Further, the communication network 110 may be a public network, a private network, or a combination thereof. The communication network 110 is implemented using any number of communications links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the computer system 600 shown in FIG. 6.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the chatbot system 106 using the client devices 102 and 104 that are connected to the communication network 110 by direct and/or indirect communication. The chatbot system 106 provides a web-based chat interface, which users can use to communicate with an artificial intelligence (AI) chatbot facilitated by the chatbot system 106. For example, users can use a client device 102 to type, speak, or otherwise enter text into the chatbot interface, which is then transmitted to the chatbot system 106 to be analyzed and processed by the chatbot. In this way, users can ask the chatbot system 106 to perform specified actions, such as providing the user with data, executing an application, executing another command, and so forth. As part of processing the requested action, the chatbot system 106 may formulate a response message and transfer the response message to the user within the chat interface. For example, the response message may provide requested data, confirm completion of a requested action, request additional detail, and the like.

Although the shown system 100 includes only two client devices 102, 104, this is only for ease of explanation and is not meant to be limiting. One skilled in the art would appreciate that the system 100 can include any number of client devices 102, 104. Further, the chatbot system 106 may concurrently accept connections from and interact with any number of client devices 102, 104. The chatbot system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the chatbot system 106 via a client-side application installed on the client devices 102 and 104. In some embodiments, the client-side application includes a component specific to the chatbot system 106. For example, the component may be a stand-alone application, one or more application plug-ins, and/or a browser extension. However, the users may also interact with the chatbot system 106 via a third-party application, such as a web browser, that resides on the client devices 102 and 104 and is configured to communicate with the chatbot system 106. In either case, the client-side application presents a user interface (UI) for the user to interact with the chatbot system 106. For example, the user interacts with the chatbot system 106 via a client-side application integrated with the file system or via a webpage displayed using a web browser application.

The chatbot system 106 is one or more computing devices configured to facilitate an AI chatbot that users can communicate with to request data, execute commands, and so forth. For example, the chatbot system 106 provides a web-based chat interface, which users can use to communicate with the chatbot facilitated by the chatbot system 106. The chat interface enables user to type, speak, or otherwise enter text, which is then transmitted to the chatbot system 106 to be analyzed and processed by the chatbot. In this way, users can ask the chatbot system 106 to perform specified actions, such as providing the user with data, executing an application, executing another command, and so forth. The chatbot system 106 may also formulate and return response messages to the user within the chat interface. For example, the response message may provide data requested by the user, confirm completion of a requested action, request additional detail, and so forth.

The chatbot system 106 uses the intent of the received message to determine how to properly respond to a user's message. The intent indicates the intention or purpose of the message, such as whether the user is requesting information, asking that a command be executed, and so forth. The chatbot system 106 uses the determined intent along with the other contextual words in the message to properly respond to the message. For example, if the determined intent of the message is to receive information, the chatbot system 106 uses the other words in the message to determine what information the user would like to receive, such as data regarding a specific product, topic, and so forth. Once determined, the chatbot system 106 gathers the requested data and formulates a response message that includes the requested data. The chatbot system 106 then transmits the response message to the user's client device 102, where it is presented within the chat interface.

The text classification system 108 determines the intent of a message that was received by the chatbot system 106 (e.g., received by the chatbot system 106 from a client device 102). Although the text classification system 108 is shown as being separate from the chatbot system 106, this is just one embodiment and is not meant to be limiting. In some embodiments, the text classification system 108 is incorporated as part of the chatbot system 106.

The text classification system 108 determines the intent of a message using a text classification model. The text classification model assigns probability values to each of a set of classification labels for a given text based on an analysis of the individual words in the text. Each of the text classification labels indicates one possible categorization for the text, such as an intent of the text. That is, each text classification label represents one possible intent of the text. The probability value assigned to each text classification label indicates the likelihood that the classification label (e.g., the intent corresponding to the classification label) properly classifies the text. The text classification label with the highest probability value is determined to have the highest probability of properly indicating the intent of the text.

The text classification system 108 determines the probability values for each classification label based on coefficient values determined for the individual words in the text. Each coefficient value determined for a word indicates the strength at which the word indicates that the corresponding classification label (e.g., intent) properly categorizes the word. Accordingly, a word that is a strong indicator of a classification label will have a relatively higher coefficient value for the classification label, whereas a word that is a weak indicator of the classification label will have a relatively lower coefficient value for the classification label. To determine which classification label (e.g., intent) properly categorizes a text, the text classification system 108 determines a set of coefficient values for each word in the text. Each coefficient value in the set of coefficient values corresponds to a unique one of the categorization labels. The text classification system 108 then uses the sets of coefficient values to calculate the probability values for each classification label, which is used to determine the categorization label (e.g., intent) that most likely categorizes the text. For example, the text classification system 108 may determine that the text is properly categorized by the categorization label (e.g., intent) with the highest probability value.

The text classification system 108 determines the set of coefficient values for a word using a set of mathematical functions that each output a coefficient value based on an input embedding value for the word. The combined output of the mathematical functions, given the same input embedding value, results in the set of coefficient values for the word corresponding to the embedding value.

The embedding value for a word includes a value (e.g., vector) that uniquely represents the word, as well as a another value (e.g., vector) that represents the distribution variance of the word. The text classification system 108 determines the embedding value for a word using an existing probabilistic word representation model, such as Probabilistic FastText, that outputs a Gaussian distribution that represents the word.

A Gaussian distribution is a continuous probability distribution represented by a function indicating the probabilities of occurrence of different possible values representing the word (e.g., bell curve). The text classification system 108 determines the embedding value for the word based on the mean vector of the Gaussian distribution, which indicates the expected value of the word (e.g., the value with the highest probability of occurrence or center, the center of the bell curve).

The shape of the Gaussian distribution is defined by a distribution variance value indicating how spread out the values are within the distribution. For example, a word that only has a few likely meanings may be represented by a Gaussian distribution with a relatively smaller distribution variance value, resulting in a visually taller and skinnier distribution. In contrast, a word that has many likely meanings may be represented by a Gaussian distribution with a relatively larger distribution variance value, resulting in a visually shorter and fatter distribution.

The text classification system 108 determines the set of mathematical functions based on the predetermined sets of coefficient values for the known words, the determined embedding values of each of the known words, and the distribution variance values associated with the Gaussian representations for each of the known words.

As each mathematical function corresponds to only one of the classification labels, the text classification system 108 determines each respective mathematical function based on a subset of the coefficient values for the known words that correspond to the given classification label. Each mathematical function defines a continuous surface over an embedding space that includes each coefficient value in the subset of the coefficient values that corresponds to the given classification label.

The text classification system 108 uses the Gaussian distribution of each word to determine a mathematical function that defines the continuous surface over the embedding space, such that each point in the embedding space can be attributed a corresponding coefficient value. For example, the text classification system 108 uses the distribution variance values corresponding to each known word to determine the variance of the continuous surface at the point in the embedding space corresponding to the known word.

Rather than use the distribution variance values themselves, the text classification system 108 may use the distribution variance values to adjust a standard distribution variance value. For example, the text classification system 108 may compare the distribution variance value corresponding to a known word to a threshold distribution variance value. In the event that the distribution variance value is greater than the threshold distribution variance value, the text classification system 108 may increase the standard distribution variance value used at the point in the continuous surface that corresponds to the known word. Alternatively, in the event that the distribution variance value is less than the threshold distribution variance value, the text classification system 108 may decrease the standard distribution variance value used at the point in the continuous surface that corresponds to the known word.

Once the probability values have been calculated, the text classification system 108 identifies the classification label with the highest probability value to properly classify the text. For example, given a set of classification labels that indicate possible intents of a text, the text classification system 108 identifies the classification label with the highest probability value to identify the most likely intent of the text. The determined intent of the text can then be used for a variety of purposes, such as performing an action requested in the text, formulating a response to the text, and so forth.

Figure 2:
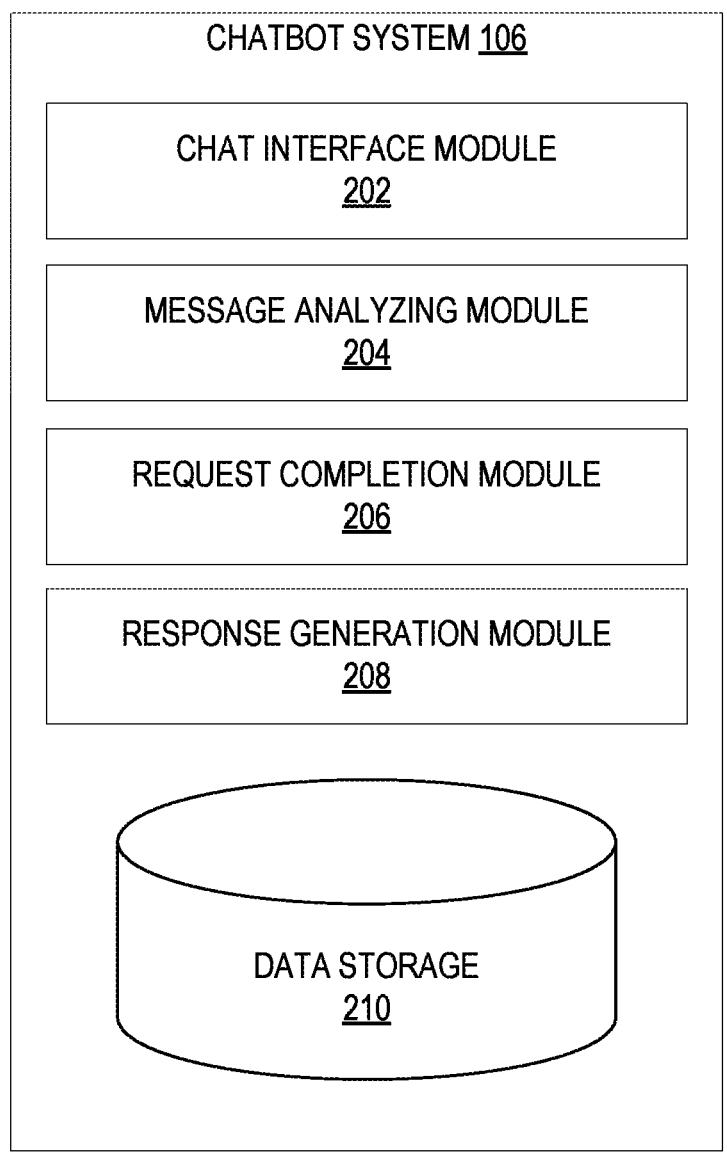
FIG. 2 is a block diagram of a chatbot system, according to some example embodiments.

FIG. 2 is a block diagram of the chatbot system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the chatbot system 106 to facilitate additional functionality that is not specifically described herein. Furthermore, the various functional modules depicted in FIG. 2 may reside on a single computing device or may be distributed across several computing devices in various arrangements such as those used in cloud-based architectures. For example, the various functional modules and components may be distributed amongst computing devices that facilitate both the chatbot system 106 and the text classification system 108.

As shown, the chatbot system 106 includes a chat interface module 202, a message analyzing module 204, a request completion module 206, a response generation module 208, and a data storage 210. The chat interface module 202 provides a user's client device 102 with a web-based chat interface that enables the user to interact with AI chatbot functionality that is facilitated by the chatbot system 106. The chat interface is a user interface that allows a user to enter messages to be transmitted to the chatbot system 106, as well as receive messages provided to the user by the chatbot system 106. For example, the chat interface enables a user to enter messages by typing in the message and/or using a voice command. Similarly, the chat interface presents the user with messages transmitted by the chatbot system 106 by presenting the message written out within the chat interface and/or causing the message to be verbally output to the user. In any case, the user uses the chat interface provided by the chat interface module 202 to enter messages that are transmitted to the chatbot system 106, as well as receive messages sent to the user by the chatbot system 106.

The message analyzing module 204 analyzes messages received from a user to determine how to properly respond to the received message. That is, the message analyzing module 204 determines an intent of the message, as well as other contextual data to determine the meaning of the message. As explained above, the intent of the message is determined using the functionality of the text classification system 108. The message analyzing module 204 communicates with the text classification system 108 to determine the intent of a received message. For example, the message analyzing module 204 provides the text classification system 108 with a received text (i.e., message). In response, the text classification system 108 provides the message analyzing module 204 with either a determined intent of the message, a set of two or more possible intents, or probability scores determined for each intent. That is, either the text classification system 108 determines the intent and provides the intent to the message analyzing module 204 or provides the message analyzing module 204 with the probability score data that the message analyzing module 204 uses to determine the intent of the message. For example, the message analyzing module 204 selects the intent with the highest probability score. The functionality of the text classification system 108 is described in greater detail below in relation to FIG. 3.

The message analyzing module 204 uses the determined intent along with the other contextual words in the message to determine the meaning of the message. For example, if the determined intent of the message is to receive information, the message analyzing module 204 uses the other words in the message to determine what information the user would like to receive, such as data regarding a specific product, topic, and so forth.

The request completion module 206 executes a requested action or command received from the user in the message. For example, a user may make a request for specified data, such as product data, in which case the request completion module 206 gathers the requested data from the data storage 210 and/or a remote data storage (not shown). As another example, the user may request that a specified action be completed, in which case the request completion module 206 performs the specified action by transmitting appropriate commands to execute the specified action.

The response generation module 208 generates a response message to be transmitted to the user. The response message may include data requested by the user and gathered by the request completion module 206, a confirmation that a specified action requested by the user was completed, a request for additional information from the user, and so forth. The response message generated by the response generation module 208 is transmitted by the chatbot system 106 to the user's client device 102, where it is presented to the user in the chat interface.

Figure 3:
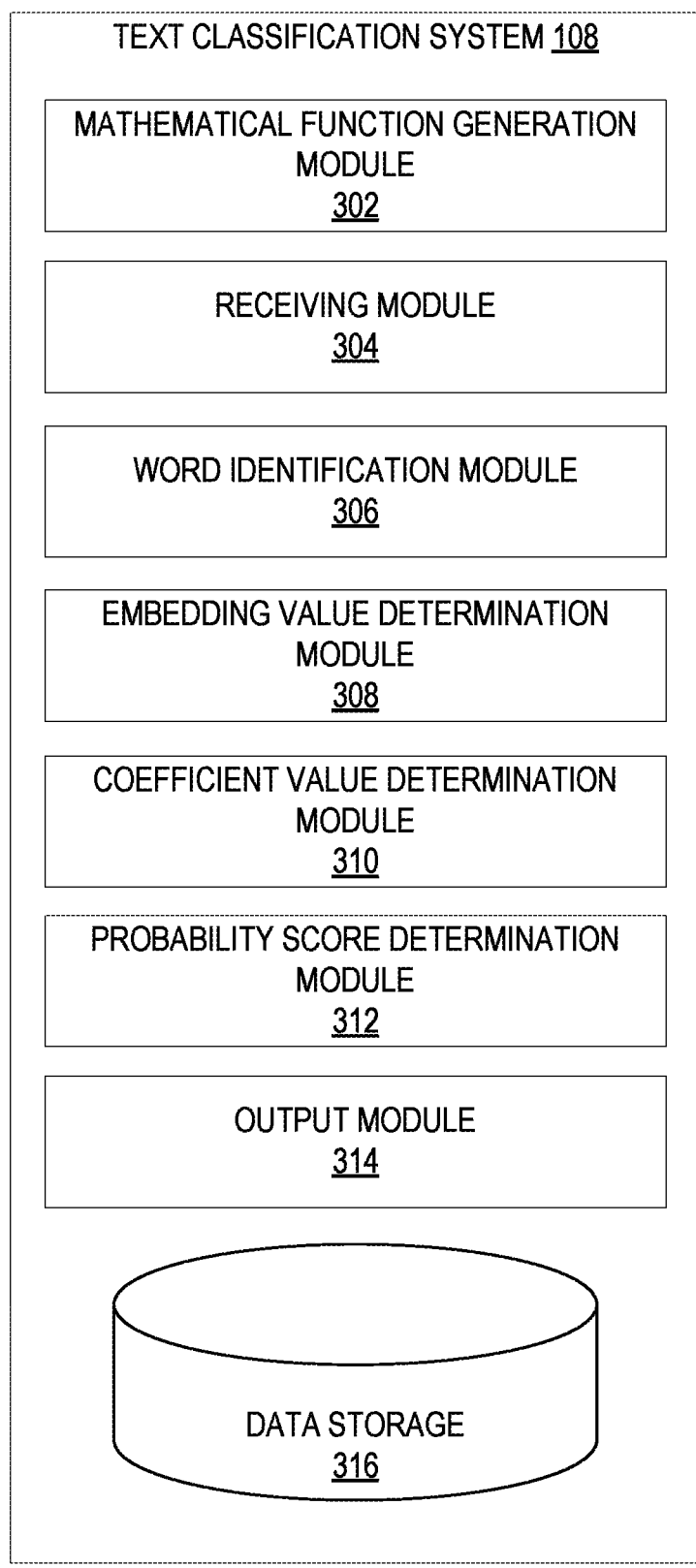
FIG. 3 is a block diagram of a text classification system, according to some example embodiments.

FIG. 3 is a block diagram of the text classification system 108, according to some example embodiments. The text classification system 108 uses a text classification model to assign probability values to a set of classification labels for a given text. Each classification label corresponds to a different intent that can be assigned to the text. The probability values assigned to each classification label by the text classification system 108 indicate the estimated probability that the intent associated to the classification label properly categorizes the text. The text classification system 108 determines the probability values based on coefficient values assigned to each word in a given text. One advantage of the text classification system 108 is that it uses a set of mathematical functions, rather than a listing of known words, to determine a set of coefficient values for each word identified in a text. The set of mathematical functions can be used to determine coefficient values for known and unknown words (e.g., not included in a listing of known words) in the text. Current solutions ignore unknown word (e.g., assign the unknown word a coefficient value of zero). Accordingly, the text classification system 108 of the present disclosure provides technical improvements over existing systems.

To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the text classification system 108 to facilitate additional functionality that is not specifically described herein. Furthermore, the various functional modules depicted in FIG. 3 may reside on a single computing device or may be distributed across several computing devices in various arrangements such as those used in cloud-based architectures. For example, the various functional modules and components may be distributed amongst computing devices that facilitate both the text classification system 108 and the chatbot system 106.

As shown, the text classification system 108 includes a mathematical function generation module 302, a receiving module 304, a word identification module 306, an embedding value determination module 308, a coefficient value determination module 310, a probability score determination module 312, an output module 314, and a data storage 316.

The mathematical function generation module 302 generates a set of mathematical functions for a set of classification labels. Each generated mathematical function receives as input an embedding value representing a word and outputs a coefficient value for a unique one of the classification labels (e.g., intents). The coefficient value output by each mathematical function indicates the strength at which the word represented by the embedding value indicates the intent associated with the classification label. The mathematical function generation module 302 generates a separate mathematical function for each classification label.

The mathematical function generation module 302 generates a mathematical function for a classification label (e.g., intent) based on the embedding values for the known words, the coefficient values of the known words that correspond to the classification label, and the distribution variance values associated with the Gaussian representations for each of the known words. The mathematical function generation module 302 repeats this process for each classification label, which results in the set of mathematical functions. The mathematical function generation module 302 stores the generated mathematical functions in the data storage 316. The functionality of the mathematical function generation module 302 is described in greater detail in relation to FIG. 4.

The receiving module 304 receives a text (e.g., message) from the chatbot system 106. The received message includes one or more words entered by a user using the user's client device, which was transmitted from the user's client device 102 to the chatbot system 106. A word may be any known word or grouping of characters.

The word identification module 306 identifies individual words in the text received by the receiving module 304. The word identification module 306 parses the received text to identify the individual words. For example, the word identification module 304 identifies words based on spaces, punctuation, and the like that may indicate a separation between words in the text. The word identification module 304 may also remove punctuation or other characters or symbols that are not part of the identified words.

The embedding value determination module 308 determines embedding values for each of the words identified in the text by the word identification module 306. The embedding value for a word is a value (e.g., vector) that uniquely represents the word. The embedding value determination module 308 determines the embedding value for a word using an existing probabilistic word representation model, such as Probabilistic FastText, that outputs a Gaussian distribution that represents the word. That is, the embedding value determination module 308 uses each identified word as input into the probabilistic word representation model, which outputs the Gaussian distribution that represents the word.

A Gaussian distribution is a continuous probability distribution represented by a function indicating the probabilities of occurrence of different possible values representing the word (e.g., bell curve). The embedding value determination module 308 determines the embedding value for the word based on the mean vector of the Gaussian distribution, which indicates the expected value of the word (e.g., the value with the highest probability of occurrence or center, the center of the bell curve). The embedding value determination module 308 may store the embedding values for the identified words in the data storage 316.

The coefficient value determination module 310 determines a set of coefficient values for each word identified in the received text. The set of coefficient values includes a separate coefficient value for each of the classification labels used by the text classification system 108. As explained above, each classification label corresponds to a possible intent of the text. Each coefficient value in the set of coefficient values represents how strongly the word indicates the intent corresponding to the respective coefficient value. Accordingly, a coefficient value for a word that is a strong indicator of the corresponding intent will be relatively high, whereas the coefficient value for a word that is a weak indicator for the corresponding intent will be relatively low.

The coefficient value determination module 310 determines the set of coefficient values for a word by using the embedding value for the word as input into each of the mathematical functions generated by the mathematical function generation module 302. The resulting output coefficient values from each mathematical function is assigned by the coefficient value determination module 310 as the set of coefficient values for the word.

The probability score determination module 312 determines the probability score for each classification label based on the sets of coefficient values determined for each word in the text. Specifically, the probability score determination module 312 determines the probability score for a classification label based on the coefficient value from each of the sets of coefficient values that corresponds to the given classification label. That is, the probability score determination module 312 gathers the coefficient value from each set of coefficient values that represents how strongly the word indicates the intent corresponding to the given classification label and then calculates the probability score for the given classification label based on the gathered coefficient values. For example, the probability score determination module 312 may sum the gathered coefficient values to determine the probability score for the given classification label.

The output module 314 provides output to the chatbot system 106. The output may include the probability values determined by the probability score determination module 312 and/or data indicative of which intent(s) properly categorize the received text. That is, the output module 314 may compare the probability scores and select the classification label with the highest probability score or set of classification labels with the highest probability scores as indicating the intent on the input text. The output module 314 transmits the output data to the chatbot system 106.

Figure 4:
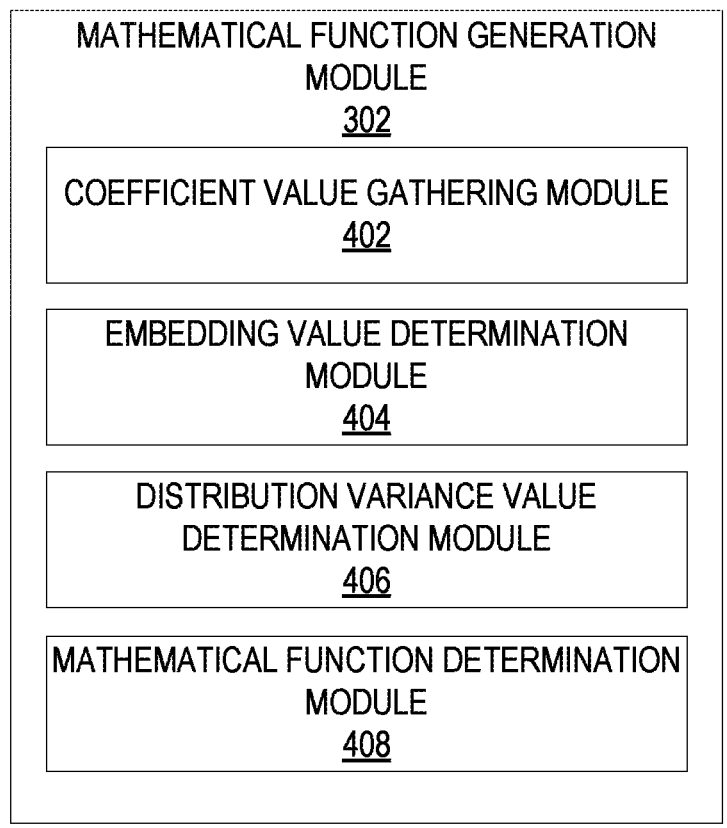
FIG. 4 is a block diagram of a mathematical function generation module, according to some example embodiments.

FIG. 4 is a block diagram of the mathematical function generation module 302, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the mathematical function generation module 302 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the mathematical function generation module 302 includes a coefficient value gathering module 402, an embedding value determination module 404, a distribution variance value determination module 408, and a mathematical function determination module 408. The coefficient value gathering module 402 gathers the coefficient values for the set of known words. For example, the coefficient value gathering module 402 gathers the coefficient values from a listing of known words maintained in the data storage 314.

The embedding value determination module 404 determines embedding values for each of the known words. The embedding value for a word is a value (e.g., vector) that uniquely represents the word. The embedding value determination module 404 determines the embedding value for a word using an existing probabilistic word representation model, such as Probabilistic FastText, that outputs a Gaussian distribution that represents the word. That is, the embedding value determination module 404 uses each known word as input into the probabilistic word representation model, which outputs the Gaussian distribution that represents the word.

A Gaussian distribution is a continuous probability distribution represented by a function indicating the probabilities of occurrence of different possible values representing the word (e.g., bell curve). The embedding value determination module 404 determines the embedding value for the word based on the mean vector of the Gaussian distribution, which indicates the expected value of the word (e.g., the value with the highest probability of occurrence or center, the center of the bell curve). The embedding value determination module 404 may store the embedding values for the known words in the data storage 316 and associate the embedding values with their corresponding known words.

The distribution variance value determination module 406 determines a distribution variance value for each known word. The shape of the Gaussian distribution is defined by a distribution variance value indicating how spread out the values are within the distribution. For example, a word that only has a few likely meanings may be represented by a Gaussian distribution with a relatively smaller distribution variance value, resulting in a visually taller and skinnier distribution. In contrast, a word that has many likely meanings may be represented by a Gaussian distribution with a relatively larger distribution variance value, resulting in a visually shorter and fatter distribution. The distribution variance value determination module 406 analyzes the Gaussian distributions for each known word to determine a distribution variance value for each known word. The distribution variance value determination module 406 stores the distribution variance value for the known words in the data storage 316 and associate the embedding values with their corresponding known words The mathematical function determination module 408 generates the set of mathematical functions based on the predetermined sets of coefficient values for the known words, the determined embedding values of each of the known words, and the distribution variance values associated with the Gaussian representations for each of the known words.

As each mathematical function corresponds to only one of the classification labels, the mathematical function determination module 408 determines each respective mathematical function based on a subset of the coefficient values for the known words that correspond to the given classification label. Each mathematical function defines a continuous surface over an embedding space that includes each coefficient value in the subset of the coefficient values that corresponds to the given classification label.

The mathematical function determination module 408 uses the Gaussian distribution of the know words to determine a mathematical function that defines the continuous surface over the embedding space, such that each point in the embedding space can be attributed a corresponding coefficient value. For example, the mathematical function determination module 408 uses the distribution variance values corresponding to each known word to determine the variance of the continuous surface at the point in the embedding space corresponding to the known word.

Rather than use the distribution variance values themselves, the mathematical function determination module 408 may use the distribution variance values to adjust a standard variance value. For example, the mathematical function determination module 408 may compare the distribution variance value corresponding to a known word to a threshold distribution variance value. In the event that the distribution variance value is greater than the threshold distribution variance value, the mathematical function determination module 408 may increase the standard variance value used at the point in the continuous surface that corresponds to the known word. Alternatively, in the event that the distribution variance value is less than the threshold distribution variance value, the mathematical function determination module 408 may decrease the standard variance value used at the point in the continuous surface that corresponds to the known word.

The mathematical function determination module 408 repeats this process for each classification label, resulting in a set of mathematical functions that includes mathematical functions corresponding to each classification label. The mathematical function determination module 408 stores the resulting mathematical functions in the data storage 316.

The mathematical function generation module 408 may generate the set of mathematical functions either during a training mode (e.g., after the coefficient values are determined for the listing of known words) or during runtime (e.g., after a text has been received).

Figure 5:
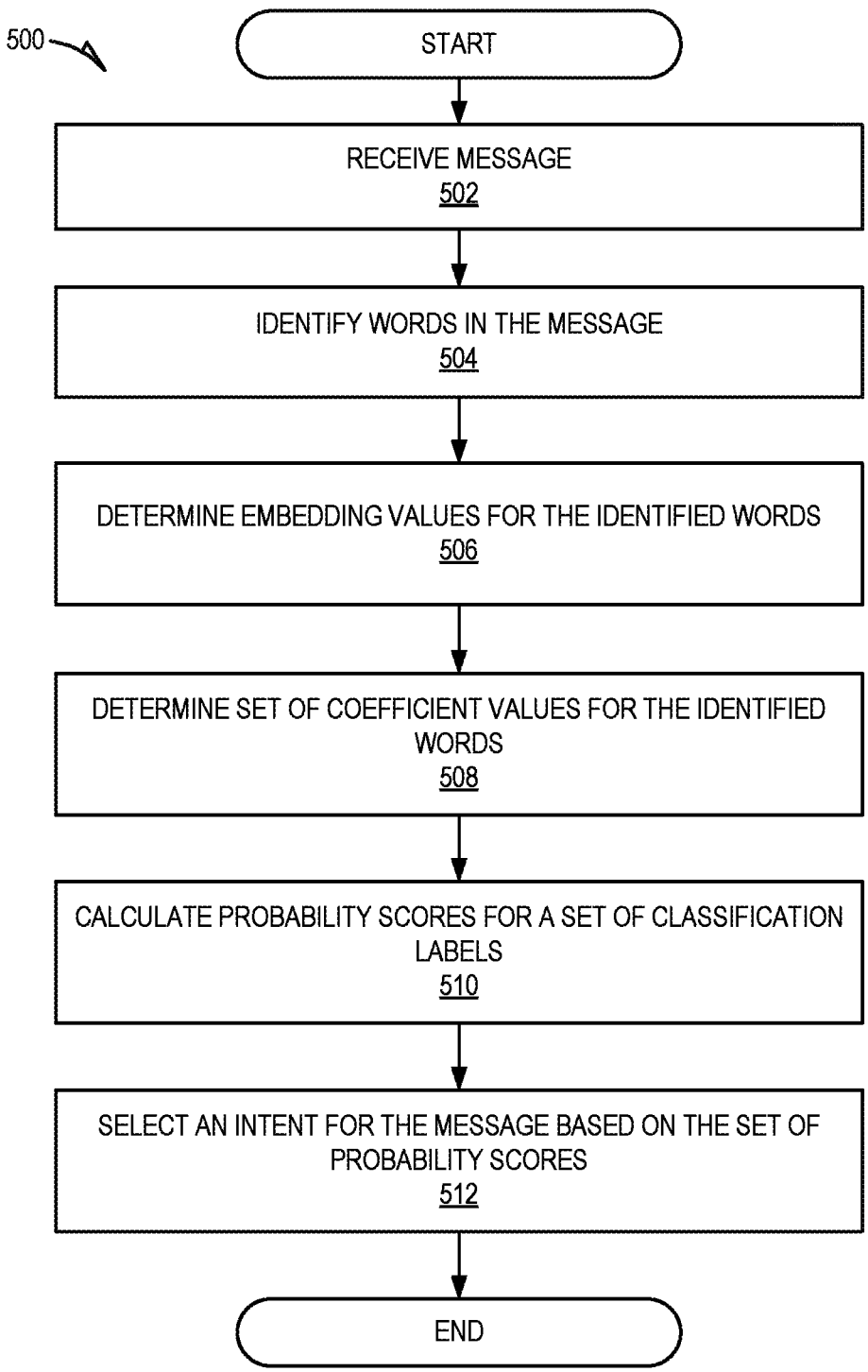
FIG. 5 is a flowchart showing an example method of probabilistic word embeddings for text classification, according to certain example embodiments.

FIG. 5 is a flowchart showing an example method 500 of probabilistic word embeddings for text classification, according to certain example embodiments. The method 500 may be embodied in computer readable instructions for execution by one or more processors such that the operations of the method 500 may be performed in part or in whole by the text classification system 108; accordingly, the method 500 is described below by way of example with reference thereto. However, it shall be appreciated that at least some of the operations of the method 500 may be deployed on various other hardware configurations and the method 500 is not intended to be limited to the text classification system 108.

At operation 502, the receiving module 304 receives a message. The receiving module 304 receives a text (e.g., the message) from the chatbot system 106. The received message includes one or more words entered by a user using the user's client device, which was transmitted from the user's client device 102 to the chatbot system 106. A word may be any known word or grouping of characters.

At operation 504, the word identification module 306 identifies words in the message. The word identification module 306 identifies individual words in the message received by the receiving module 304. The word identification module 306 parses the received text (e.g., message) to identify the individual words. For example, the word identification module 304 identifies words based on spaces, punctuation, and the like that may indicate a separation between words in the text. The word identification module 304 may also remove punctuation or other characters or symbols that are not part of the identified words.

At operation 506, the embedding value determination module 308 determines embedding values for the identified words. The embedding value determination module 308 determines embedding values for each of the words identified in the text by the word identification module 306. The embedding value for a word is a value (e.g., vector) that uniquely represents the word. The embedding value determination module 308 determines the embedding value for a word using an existing probabilistic word representation model, such as Probabilistic FastText, that outputs a Gaussian distribution that represents the word. That is, the embedding value determination module 308 uses each identified word as input into the probabilistic word representation model, which outputs the Gaussian distribution that represents the word.

A Gaussian distribution is a continuous probability distribution represented by a function indicating the probabilities of occurrence of different possible values representing the word (e.g., bell curve). The embedding value determination module 308 determines the embedding value for the word based on the mean vector of the Gaussian distribution, which indicates the expected value of the word (e.g., the value with the highest probability of occurrence or center, the center of the bell curve). The embedding value determination module 308 may store the embedding values for the identified words in the data storage 316.

At operation 508, the coefficient value determination module 310 determines a set of coefficient values for the identified words. The set of coefficient values includes a separate coefficient value for each of the classification labels used by the text classification system 108. As explained above, each classification label corresponds to a possible intent of the text. Each coefficient value in the set of coefficient values represents how strongly the word indicates the intent corresponding to the respective coefficient value. Accordingly, a coefficient value for a word that is a strong indicator of the corresponding intent will be relatively high, whereas the coefficient value for a word that is a weak indicator for the corresponding intent will be relatively low.

The coefficient value determination module 310 determines the set of coefficient values for a word by using the embedding value for the word as input into each of the mathematical functions generated by the mathematical function generation module 302. The resulting output coefficient values from each mathematical function is assigned by the coefficient value determination module 310 as the set of coefficient values for the word.

At operation 510, the probability score determination module 312 calculates probability scores for a set of classification labels. The probability score determination module 312 determines the probability score for each classification label based on the sets of coefficient values determined for each word in the text. Specifically, the probability score determination module 312 determines the probability score for a classification label based on the coefficient value from each of the sets of coefficient values that corresponds to the given classification label. That is, the probability score determination module 312 gathers the coefficient value from each set of coefficient values that represents how strongly the word indicates the intent corresponding to the given classification label and then calculates the probability score for the given classification label based on the gathered coefficient values. For example, the probability score determination module 312 may sum the gathered coefficient values to determine the probability score for the given classification label.

At operation 512, the output module 314 selects an intent for the message based on the set of probability scores. The output module 314 provides output to the chatbot system 106. The output may include the probability values determined by the probability score determination module 312 and/or data indicative of which intent(s) properly categorize the received text. That is, the output module 314 compares the probability scores for each classification label and selects the classification label with the highest probability. The output module 314 then selects the intent corresponding to the classification label with the highest probability scores.

EXAMPLES

Example 1 is a method comprising: receiving, from a client device, a first message transmitted as part of a communication session, the first message including at least a first keyword; determining a first embedding probability distribution representing the first keyword; determining a first embedding value for the first keyword based on the first embedding probability distribution; using the first embedding value as input into each mathematical function in a set mathematical functions, yielding a first set of coefficient values for the first keyword, each respective mathematical function from the set of mathematical functions corresponding to a respective classification label from a set of classification labels and defining a continuous surface, each respective mathematical function determined from embedding values for a set of known keywords, distribution variance values for the set of known keywords, and a subset of coefficient values for the set of known keywords, the respective subset of coefficient values corresponding to the respective classification label; for each classification label from the set of classification labels, calculating a probability score based on the first set of coefficient values, yielding a set of probability scores for the first message; and assigning a first classification label from the set of classification labels to the first message based on the set of probability scores for the first message.

In Example 2, the subject matter of Example 1 optionally includes wherein determining the first embedding value for the first keyword comprises: determining a mean vector of the first embedding probability distribution representing the first keyword.

In Example 3, the subject matter of Example 1 or Example 2 optionally includes comparing the probability scores from the set of probability scores to identify a highest probability score, yielding a comparison; and determining, based on the comparison, that a first probability score from the set of probability scores is the highest probability score, the first probability score corresponding to the first classification label.

In Example 4, the subject matter of Examples 1 to 3 optionally includes for each known keyword from the set of known keywords, determining, based on an embedding probability distribution representing the respective known keyword, an embedding value for the respective known keyword, yielding the embedding values for the set of known keywords; and for each known keyword, determining, based on the embedding probability distribution representing the respective known keyword, a distribution variance value for the respective known keyword, yielding the distribution variance values for the set of known keywords; and determining the set of mathematical functions based on the embedding values for the set of known keywords, the distribution variance values for the set of known keywords, and the respective subset of coefficient values corresponding to the respective classification label, each mathematical function defining a continuous surface that includes each coefficient value from the respective subset of coefficient values across an embedding space, a shape of the surface being determined based on the distribution variance values for the set of known keywords.

In Example 5, the subject matter of Example, 1 to 4 optionally includes wherein determining the set of mathematical functions comprises: comparing a first distribution variance value corresponding to a first known keyword from the set of known keywords to a threshold distribution variance value, yielding a comparison; determining a first adjusted distribution variance value based on the comparison; and determining the space of the surface spanning from a first coefficient value corresponding to the first known keyword to a second coefficient value based on the first adjusted distribution variance value.

In Example 6, the subject matter of Examples 1 to 5 optionally includes wherein each classification label from the set of classification labels corresponds to a possible intent of the text.

In Example 7, the subject matter of Examples 1 to 6 optionally includes determining a response message to the first message based on a first intent corresponding to the first classification label, and transmitting the response message to the client device.

Example 8 is computing system comprising: one or more computer processors; and one or more computer-readable mediums storing instructions that, when executed by the one or more computer processors, cause the computing system to perform operations comprising: receiving, from a client device, a first message transmitted as part of a communication session, the first message including at least a first keyword; determining a first embedding probability distribution representing the first keyword; determining a first embedding value for the first keyword based on the first embedding probability distribution; using the first embedding value as input into each mathematical function in a set mathematical functions, yielding a first set of coefficient values for the first keyword, each respective mathematical function from the set of mathematical functions corresponding to a respective classification label from a set of classification labels and defining a continuous surface, each respective mathematical function determined from embedding values for a set of known keywords, distribution variance values for the set of known keywords, and a subset of coefficient values for the set of known keywords, the respective subset of coefficient values corresponding to the respective classification label; for each classification label from the set of classification labels, calculating a probability score based on the first set of coefficient values, yielding a set of probability scores for the first message; and assigning a first classification label from the set of classification labels to the first message based on the set of probability scores for the first message.

In Example 9, the subject matter of Example 8 optionally includes wherein determining the first embedding value for the first keyword comprises: determining a mean vector of the first embedding probability distribution representing the first keyword.

In Example 10, the subject matter of Example 8 or Example 9 optionally includes comparing the probability scores from the set of probability scores to identify comparing the probability scores from the set of probability scores to identify a highest probability score, yielding a comparison; and determining, based on the comparison, that a first probability score from the set of probability scores is the highest probability score, the first probability score corresponding to the first classification label.

In Example 11, the subject matter of Examples 8 to 10 optionally includes for each known keyword from the set of known keywords, determining, based on an embedding probability distribution representing the respective known keyword, an embedding value for the respective known keyword, yielding the embedding values for the set of known keywords; and for each known keyword, determining, based on the embedding probability distribution representing the respective known keyword, a distribution variance value for the respective known keyword, yielding the distribution variance values for the set of known keywords; and determining the set of mathematical functions based on the embedding values for the set of known keywords, the distribution variance values for the set of known keywords, and the respective subset of coefficient values corresponding to the respective classification label, each mathematical function defining a continuous surface that includes each coefficient value from the respective subset of coefficient values across an embedding space, a shape of the surface being determined based on the distribution variance values for the set of known keywords.

In Example 12, the subject matter of Examples 8 to 11 optionally includes wherein determining the set of mathematical functions comprises: comparing a first distribution variance value corresponding to a first known keyword from the set of known keywords to a threshold distribution variance value, yielding a comparison; determining a first adjusted distribution variance value based on the comparison; and determining the space of the surface spanning from a first coefficient value corresponding to the first known keyword to a second coefficient value based on the first adjusted distribution variance value.

In Example 13, the subject matter of Examples 8 to 12 optionally includes wherein each classification label from the set of classification labels corresponds to a possible intent of the text.

In Example 14, the subject matter of Examples 8 to 13 optionally includes determining a response message to the first message based on a first intent corresponding to the first classification label, and transmitting the response message to the client device.

Example 15 non-transitory computer-readable medium storing instructions that, when executed by one or more computer processors of a computing system, cause the computing system to perform operations comprising: receiving, from a client device, a first message transmitted as part of a communication session, the first message including at least a first keyword; determining a first embedding probability distribution representing the first keyword; determining a first embedding value for the first keyword based on the first embedding probability distribution; using the first embedding value as input into each mathematical function in a set mathematical functions, yielding a first set of coefficient values for the first keyword, each respective mathematical function from the set of mathematical functions corresponding to a respective classification label from a set of classification labels and defining a continuous surface, each respective mathematical function determined from embedding values for a set of known keywords, distribution variance values for the set of known keywords, and a subset of coefficient values for the set of known keywords, the respective subset of coefficient values corresponding to the respective classification label; for each classification label from the set of classification labels, calculating a probability score based on the first set of coefficient values, yielding a set of probability scores for the first message; and assigning a first classification label from the set of classification labels to the first message based on the set of probability scores for the first message.

In Example 16, the subject matter of Example 15 optionally includes wherein determining the first embedding value for the first keyword comprises: determining a mean vector of the first embedding probability distribution representing the first keyword.

In Example 17, the subject matter of Example 15 or Example 16 comparing the probability scores from the set of probability scores to identify a highest probability score, yielding a comparison; and determining, based on the comparison, that a first probability score from the set of probability scores is the highest probability score, the first probability score corresponding to the first classification label.

In Example 18, the subject matter of Examples 15 to 17 optionally includes for each known keyword from the set of known keywords, determining, based on an embedding probability distribution representing the respective known keyword, an embedding value for the respective known keyword, yielding the embedding values for the set of known keywords; and for each known keyword, determining, based on the embedding probability distribution representing the respective known keyword, a distribution variance value for the respective known keyword, yielding the distribution variance values for the set of known keywords; and determining the set of mathematical functions based on the embedding values for the set of known keywords, the distribution variance values for the set of known keywords, and the respective subset of coefficient values corresponding to the respective classification label, each mathematical function defining a continuous surface that includes each coefficient value from the respective subset of coefficient values across an embedding space, a shape of the surface being determined based on the distribution variance values for the set of known keywords.

In Example 19, the subject matter of Examples 15 to 18 optionally includes wherein determining the set of mathematical functions comprises: comparing a first distribution variance value corresponding to a first known keyword from the set of known keywords to a threshold distribution variance value, yielding a comparison; determining a first adjusted distribution variance value based on the comparison; and determining the space of the surface spanning from a first coefficient value corresponding to the first known keyword to a second coefficient value based on the first adjusted distribution variance value.

In Example 20, the subject matter of Examples 15 to 19 optionally includes wherein each classification label from the set of classification labels corresponds to a possible intent of the text, the operations further comprising: determining a response message to the first message based on a first intent corresponding to the first classification label; and transmitting the response message to the client device.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 6:
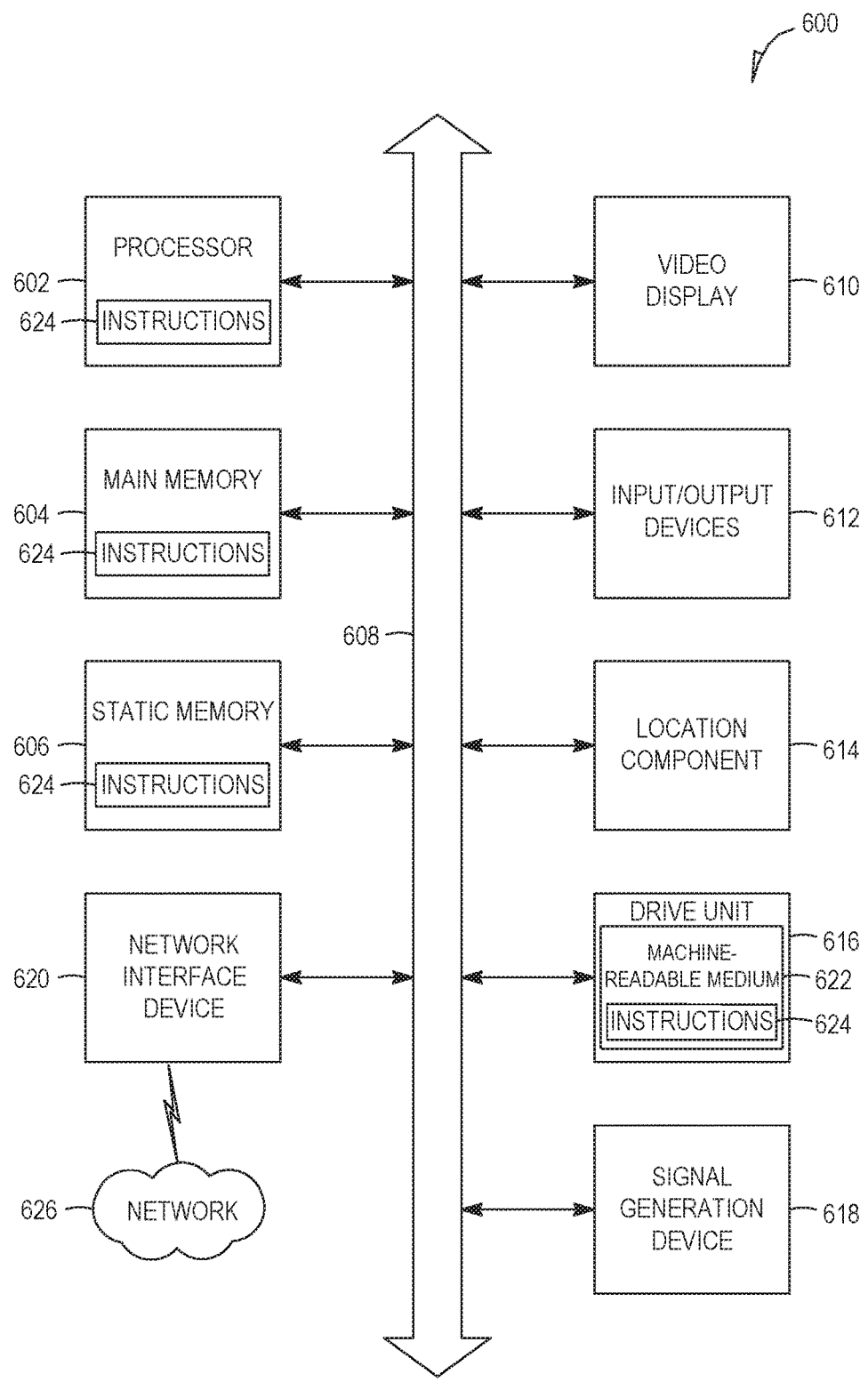
FIG. 6 is a diagrammatic representation of a machine in the example form of a computer system within which a set of instructions for causing the machine to perform any one or more of the methodologies discussed herein may be executed.

FIG. 6 is a diagrammatic representation of a machine in the example form of a computer system 600 within which a set of instructions for causing the machine to perform any one or more of the methodologies discussed herein may be executed. The computer system 600 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine may, for example, be a PC, a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 may further include a video display 610 (e.g., a liquid crystal display (LCD) or a cathode ray tube (CRT)). The computer system 600 also includes one or more input/output (I/O) devices 612, a location component 614, a drive unit 616, a signal generation device 618 (e.g., a speaker), and a network interface device 620. The I/O devices 612 may, for example, include a keyboard, a mouse, a keypad, a multi-touch surface (e.g., a touchscreen or track pad), a microphone, a camera, and the like.

The location component 614 may be used for determining a location of the computer system 600. In some embodiments, the location component 614 may correspond to a GPS transceiver that may make use of the network interface device 620 to communicate GPS signals with a GPS satellite. The location component 614 may also be configured to determine a location of the computer system 600 by using an internet protocol (IP) address lookup or by triangulating a position based on nearby mobile communications towers. The location component 614 may be further configured to store a user-defined location in main memory 604 or static memory 606. In some embodiments, a mobile location enabled application may work in conjunction with the location component 614 and the network interface device 620 to transmit the location of the computer system 600 to an application server or third party server for the purpose of identifying the location of a user operating the computer system 600.

In some embodiments, the network interface device 620 may correspond to a transceiver and antenna. The transceiver may be configured to both transmit and receive cellular network signals, wireless data signals, or other types of signals via the antenna, depending on the nature of the computer system 600.

Machine-Readable Medium

The drive unit 616 includes a machine-readable medium 622 on which is stored one or more sets of data structures and instructions 624 (e.g., software) embodying or used by any one or more of the methodologies or functions described herein. The instructions 624 may also reside, completely or at least partially, within the main memory 604, the static memory 606, and/or the processor 602 during execution thereof by the computer system 600, with the main memory 604, the static memory 606, and the processor 602 also constituting machine-readable media.

Consistent with some embodiments, the instructions 624 may relate to the operations of an operating system (OS). Depending on the particular type of the computer system 600, the OS may, for example, be the iOS® operating system, the Android® operating system, a BlackBerry® operating system, the Microsoft® Windows® Phone operating system, Symbian® OS, or webOS®. Further, the instructions 624 may relate to operations performed by applications (commonly known as "apps"), consistent with some embodiments. One example of such an application is a mobile browser application that displays content, such as a web page or a user interface using a browser.

While the machine-readable medium 622 is shown in an example embodiment to be a single medium, the term "machine-readable medium" may include a single medium or multiple media (e.g., a centralized or distributed database, and/or associated caches and servers) that store the one or more data structures or instructions 624. The term "machine-readable medium" shall also be taken to include any tangible medium that is capable of storing, encoding, or carrying instructions (e.g., instructions 624) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 624 may further be transmitted or received over a network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 624 for execution by the machine, and includes digital or analog communications signals or other intangible media to facilitate communication of such software.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
   receiving, from a client device, a first message transmitted as part of a communication session, the first message including a set of words;
   for each word in the set of words included in the first message, and by one or more computer processors, performing operations comprising:
      determining a corresponding embedding probability distribution representing the word;
      determining a corresponding embedding value for the word based on the corresponding embedding probability distribution;
      using the corresponding embedding value as input into each mathematical function in a set mathematical functions, yielding a corresponding set of coefficient values for the word, each respective mathematical function from the set of mathematical functions corresponding to a respective classification label from a set of classification labels and defining a continuous surface, each respective mathematical function determined from embedding values for a set of known keywords, distribution variance values for the set of known keywords, and a subset of coefficient values for the set of known keywords, the respective subset of coefficient values corresponding to the respective classification label; and
      for each classification label from the set of classification labels, calculating a corresponding probability score for the word based on the corresponding set of coefficient values; and
   assigning a first classification label from the set of classification labels to the first message based on the calculated probability scores for the set of classification labels and set of words included in the first message.

2. The method of claim 1, wherein determining the first embedding value for the word comprises:
   determining a mean vector of the embedding probability distribution representing the word.

3. The method of claim 1, further comprising:
   comparing the probability scores from the set of probability scores to identify a highest probability score, yielding a comparison; and
   determining, based on the comparison, that a first probability score from the set of probability scores is the highest probability score, the first probability score corresponding to the first classification label.

4. The method of claim 1, further comprising:
   for each known keyword from the set of known keywords, determining, based on an embedding probability distribution representing the respective known keyword, an embedding value for the respective known keyword, yielding the embedding values for the set of known keywords; and
   for each known keyword, determining, based on the embedding probability distribution representing the respective known keyword, a distribution variance value for the respective known keyword, yielding the distribution variance values for the set of known keywords; and
   determining the set of mathematical functions based on the embedding values for the set of known keywords, the distribution variance values for the set of known keywords, and the respective subset of coefficient values corresponding to the respective classification label, each mathematical function defining a continuous surface that includes each coefficient value from the respective subset of coefficient values across an embedding space, a shape of the surface being determined based on the distribution variance values for the set of known keywords.

5. The method of claim 4, wherein determining the set of mathematical functions comprises:
comparing a first distribution variance value corresponding to a first known keyword from the set of known keywords to a threshold distribution variance value, yielding a comparison;
determining a first adjusted distribution variance value based on the comparison; and
determining the space of the surface spanning from a first coefficient value corresponding to the first known keyword to a second coefficient value based on the first adjusted distribution variance value.

6. The method of claim 1, wherein each classification label from the set of classification labels corresponds to a possible intent of the first message.

7. The method of claim 6, further comprising:
determining a response message to the first message based on a first intent corresponding to the first classification label; and
transmitting the response message to the client device.

8. A computing system comprising:
one or more computer processors; and
one or more computer-readable mediums storing instructions that, when executed by the one or more computer processors, cause the computing system to perform operations comprising:
receiving, from a client device, a first message transmitted as part of a communication session, the first message including a set of words;
for each word in the set of words included in the first message, performing operations comprising:
determining a corresponding embedding probability distribution representing the word;
determining a corresponding embedding value for the word based on the corresponding embedding probability distribution;
using the corresponding embedding value as input into each mathematical function in a set mathematical functions, yielding a corresponding set of coefficient values for the word, each respective mathematical function from the set of mathematical functions corresponding to a respective classification label from a set of classification labels and defining a continuous surface, each respective mathematical function determined from embedding values for a set of known keywords, distribution variance values for the set of known keywords, and a subset of coefficient values for the set of known keywords, the respective subset of coefficient values corresponding to the respective classification label; and
for each classification label from the set of classification labels, calculating a corresponding probability score for the word based on the corresponding set of coefficient values; and
assigning a first classification label from the set of classification labels to the first message based on the probability scores calculated for the set of words included in the first message.

9. The computing system of claim 8, wherein determining the embedding value for the word comprises:
determining a mean vector of the embedding probability distribution representing the word.

10. The computing system of claim 8, the operations further comprising:
comparing the probability scores from the set of probability scores to identify a highest probability score, yielding a comparison; and
determining, based on the comparison, that a first probability score from the set of probability scores is the highest probability score, the first probability score corresponding to the first classification label.

11. The computing system of claim 8, the operations further comprising:
for each known keyword from the set of known words, determining, based on an embedding probability distribution representing the respective known keyword, an embedding value for the respective known keyword, yielding the embedding values for the set of known keywords; and
for each known keyword, determining, based on the embedding probability distribution representing the respective known keyword, a distribution variance value for the respective known word, yielding the distribution variance values for the set of known keywords; and
determining the set of mathematical functions based on the embedding values for the set of known keywords, the distribution variance values for the set of known keywords, and the respective subset of coefficient values corresponding to the respective classification label, each mathematical function defining a continuous surface that includes each coefficient value from the respective subset of coefficient values across an embedding space, a shape of the surface being determined based on the distribution variance values for the set of known keywords.

12. The computing system of claim 11, wherein determining the set of mathematical functions comprises:
comparing a first distribution variance value corresponding to a first known word from the set of known words to a threshold distribution variance value, yielding a comparison;
determining a first adjusted distribution variance value based on the comparison; and
determining the space of the surface spanning from a first coefficient value corresponding to the first known keyword to a second coefficient value based on the first adjusted distribution variance value.

13. The computing system of claim 8, wherein each classification label from the set of classification labels corresponds to a possible intent of the first message.

14. The computing system of claim 13, the operations further comprising:
determining a response message to the first message based on a first intent corresponding to the first classification label; and
transmitting the response message to the client device.

15. A non-transitory computer-readable medium storing instructions that, when executed by one or more computer processors of a computing system, cause the computing system to perform operations comprising:
receiving, from a client device, a first message transmitted as part of a communication session, the first message including a set of words;
for each word in the set of words included in the first message, performing operations comprising:
determining a corresponding embedding probability distribution representing the word;

determining a corresponding embedding value for the word based on the corresponding embedding probability distribution;

using the corresponding embedding value as input into each mathematical function in a set mathematical functions, yielding a corresponding set of coefficient values for the word, each respective mathematical function from the set of mathematical functions corresponding to a respective classification label from a set of classification labels and defining a continuous surface, each respective mathematical function determined from embedding values for a set of known keywords, distribution variance values for the set of known keywords, and a subset of coefficient values for the set of known keywords, the respective subset of coefficient values corresponding to the respective classification label; and for each classification label from the set of classification labels, calculating a corresponding probability score based on the corresponding set of coefficient values; and assigning a first classification label from the set of classification labels to the first message based on the probability scores calculated for the set of words included in the first message.

16. The non-transitory computer-readable medium of claim 15, wherein determining the embedding value for the keyword comprises:

determining a mean vector of the embedding probability distribution representing the word.

17. The non-transitory computer-readable medium of claim 15, the operations further comprising:

comparing the probability scores from the set of probability scores to identify a highest probability score, yielding a comparison; and determining, based on the comparison, that a first probability score from the set of probability scores is the highest probability score, the first probability score corresponding to the first classification label.

18. The non-transitory computer-readable medium of claim 15, the operations further comprising:

for each known keyword from the set of known keywords, determining, based on an embedding probability distribution representing the respective known keyword, an embedding value for the respective known keyword, yielding the embedding values for the set of known keywords; and for each known keyword, determining, based on the embedding probability distribution representing the respective known keyword, a distribution variance value for the respective known keyword, yielding the distribution variance values for the set of known keywords; and determining the set of mathematical functions based on the embedding values for the set of known keywords, the distribution variance values for the set of known keywords, and the respective subset of coefficient values corresponding to the respective classification label, each mathematical function defining a continuous surface that includes each coefficient value from the respective subset of coefficient values across an embedding space, a shape of the surface being determined based on the distribution variance values for the set of known keywords.

19. The non-transitory computer-readable medium of claim 18, wherein determining the set of mathematical functions comprises:

comparing a first distribution variance value corresponding to a first known keyword from the set of known keywords to a threshold distribution variance value, yielding a comparison;

determining a first adjusted distribution variance value based on the comparison; and determining the space of the surface spanning from a first coefficient value corresponding to the first known keyword to a second coefficient value based on the first adjusted distribution variance value.

20. The non-transitory computer-readable medium of claim 15, wherein each classification label from the set of classification labels corresponds to a possible intent of the first message, the operations further comprising:

determining a response message to the first message based on a first intent corresponding to the first classification label; and transmitting the response message to the client device.

* * * * *